United States Patent Office 3,435,671
Patented Apr. 1, 1969

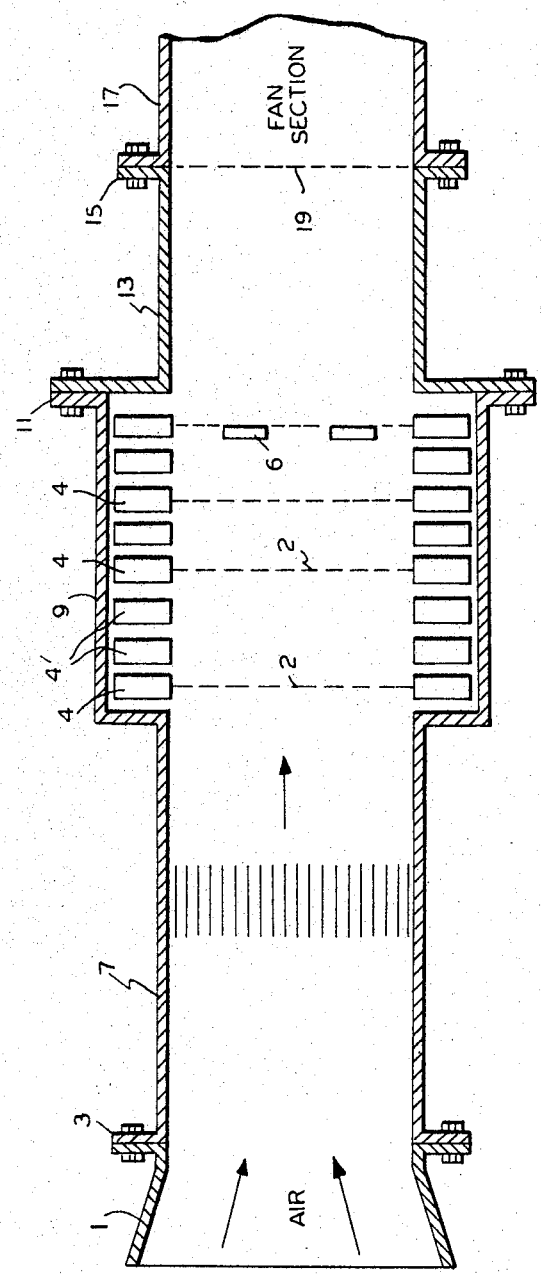

3,435,671
TRANSPORTABLE WIND TUNNEL
John M. Hildt, Amherst, N.H., assignor to Astro Dynamics, Inc., Burlington, Mass., a corporation of Massachusetts
Filed May 11, 1966, Ser. No. 549,330
Int. Cl. G01m 9/00
U.S. Cl. 73—147                3 Claims

ABSTRACT OF THE DISCLOSURE

A wind tunnel in which there are a plurality of sections. One section contains turbulence-reducing screen elements with spacer elements that may fill this section so that there is a wide range of ready adjustment of spacing, number of screen elements and other variations. There are also an air-path straightening section, a test section and suction producing means.

---

The present invention relates to transportable wind tunnels and, more particularly, to relatively low speed sub-sonic tunnels covering ranges of velocity of up to 160 miles-per-hour, more or less, for such purposes as enabling anemometer calibration, diffusion studies, and other environmental testing.

In apparatus of the character described, one of the plaguing problems is the production of a substantially constant velocity wave front of air passing into the test chamber of the wind tunnel; deviation from such uniformity introducing errors in measurements effected over a substantial cross-sectional area of the tunnel in the test chamber. It has been proposed to employ a plurality of spaced screens in advance of the test chamber for the purpose of forcing the incoming air, accelerated by the fan suction at the other end of the test chamber, to pass through the screen opening along substantially parallel paths, thereby to reduce turbulence and to attain ultimately a substantially constant velocity front of air across the wind tunnel cross-sectional area as the air enters the test chamber. Such systems, however, are bulky in construction and relatively inflexible in terms of ready adjustment of the spacing of the screens, the number of screens, and the provision for facile variation in the same, depending upon different velocities and other applications of users of the system.

It is to the solution of this problem, accordingly, that the present invention is primarily directed; it being an object of the invention to provide a new and improved multi-purpose environmental tunnel of the character described that affords maximum versatility and an extra wide range of variations in turbulence-reducing apparatus adjustments.

A further object is to provide new and improved wind tunnels of more general use, as well.

In summary, the invention contemplates a modular design in which the turbulence-reducing screen elements are provided in a separate section, all sections of greater overall dimensions than the portion of the inlet connected thereto and than the test chamber itself connected to its other end, with provisions for inlet turbulence reducing screen elements and spacer elements that may fill such section with a wide range of adjustment of spacing, number of screen elements, and other variations.

The invention will now be described in connection with the accompanying drawing, the single figure of which is a longitudinal section of a preferred embodiment.

Referring to the drawing, the wind tunnel is shown for illustrative purposes as of substantially cylindrical tubular structure having an outwardly flared inlet section 1 which may be readily connected by a first flange region 3 to a flow-straightener section 7 containing, for example, an array of honeycomb-like cells for making a coarse correction in what might otherwise be turbulent flow of the incoming air.

The air then proceeds to a novel turbulence-reducing or stilling section 9 of the invention which may, if desired, be formed integral with the walls of the straightening section 7, as shown, and of greater diameter than the same. The section 9 is in turn flange-connected at 11 to a test section 13 of substantially the same diameter as the inlet straightening section 7 and within which the apparatus to be tested (or whatever studies are to be effected) may be disposed. The section 13 is further connected, as at the flanges 15, to a fan suction section 17 provided preferably with a fan protection screen or screens 19 interposed between the sections 13 and 17.

The ends of the invention are attained by mounting the screen elements 2 in annular peripheral supporting rings 4 that may fit rather snuggly within the space defined by the larger cross-section wall portion of the turbulence-reducing section 9. Through the medium of spacer rings 4' of similar configuration and dimensions to the supporting annular rings 4 between successive screen elements 2, the position of successive screens 2 may be varied, if desired, without changing the effective diameter of air flow cross-section from the section 7 to the section 13, since the effective wall formed by the inner surfaces of the successive rings 4 and spacers 4' is substantially in line with the inner wall surfaces of the sections 7 and 13. Not only may screens 2 of different meshes be employed, thus, but the screens 2, the spacing therebetween, the numbers and types of screens and other changes may readily be effected with section 9 to suit the different turbulence conditions encountered in different applications and at different air velocities, with great flexibility.

With screens of wire mesh ranging from mesh values of 60 to 18 and of wire diameters of the order of 0.007" to 0.015", in a chamber of inner diameter in sections 7 and 13 of about from 24" to 54", and with ring supports 4 and their spacers 4' about 2" in width between their inner and outer annular radii, uniform velocity over substantially the complete cross-sectional area of the input test chamber 13 has been attained with air velocities ranging up to 160 m.p.h. Tunnels of this character have only required, for example, about ten feet of length as contrasted with much longer prior-art tunnels that, also, must employ very sizeably dimensioned stilling sections.

In cases where extreme consistency of air velocity to the order of less than 0.5% is desired, compensation can be made for the tendency of the screens to bow and for other turbulence-introducing effects that cause deviation from parallel air flow, with the aid of one or more masking rings or patches 6 placed on one or more screens 2 themselves.

Further modifications will also occur to those skilled in this art and all such are considered to fall within the spirit and scope of the invention as defined in the appended claims.

What is claimed is:
1. Wind tunnel apparatus having, in combination, an inlet section comprising air-path straightening means for making a coarse correction of the air flow, a test section connected at one end to suction-producing means, a turbulence-reducing section connected between the inlet section and the other end of the test section, the turbulence-reducing section being of outside cross-dimension greater than that of the inlet and test sections, and a plurality of successively spaced annular ring-mounted screens with annular spacers disposed therebetween housed in said turbulence-reducing section for making a fine correction of the air flow, the inner walls of the annular rings and spacers housed within the turbulence-reducing section defining an air-flow surface substantially alined and continuous with the inner walls of the inlet and test sections to provide substantially constant cross-sectional area for air flow from the inlet to the test section through the turbulence-reducing section.

2. Wind tunnel apparatus as claimed in claim 1 and in which the connection between the said other end of the test section and the turbulence-reducing section comprises a flange connection for permitting ready access to the turbulence-reducing section for enabling adjustment of the screens.

3. Wind tunnel apparatus as claimed in claim 1 and in which masking means is provided on at least one of the screens to compensate for deviations from parallel air flow over the screen.

References Cited
UNITED STATES PATENTS

| | | | |
|---|---|---|---|
| 2,799,160 | 7/1957 | Greene et al. | 73—147 |
| 2,874,001 | 2/1959 | Webb | 239—553.3 XR |
| 2,950,062 | 8/1960 | Aghnides | 239—553.3 XR |
| 3,138,332 | 6/1964 | Hinderer | 239—590.3 XR |
| 3,285,062 | 11/1966 | Flader | 73—147 |

LOUIS R. PRINCE, *Primary Examiner.*

D. E. CORR, *Assistant Examiner.*